United States Patent
Pasek (10) Patent No.: US 10,453,271 B2
(45) Date of Patent: Oct. 22, 2019

(54) AUTOMATED THUMBNAIL OBJECT GENERATION BASED ON THUMBNAIL ANCHOR POINTS

(71) Applicant: MICROSOFT TECHNOLOGY LICENSING, LLC, Redmond, WA (US)

(72) Inventor: Lukasz Jan Pasek, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 142 days.

(21) Appl. No.: 15/372,213

(22) Filed: Dec. 7, 2016

(65) Prior Publication Data

US 2018/0158251 A1 Jun. 7, 2018

(51) Int. Cl.
*G06T 19/20* (2011.01)

(52) U.S. Cl.
CPC .... *G06T 19/20* (2013.01); *G06T 2207/20021* (2013.01); *G06T 2210/22* (2013.01); *G06T 2219/2021* (2013.01)

(58) Field of Classification Search
None
See application file for complete search history.

(56) References Cited

U.S. PATENT DOCUMENTS 6,553,180 B1 * 4/2003 Kikuchi ............... G11B 19/022
386/241
6,993,726 B2 1/2006 Rosenholtz et al.
(Continued)

FOREIGN PATENT DOCUMENTS

JP 2012099906 A 5/2012

OTHER PUBLICATIONS

Elvins TT, Nadeau DR, Kirsh D, Worldlets—3D Thumbnails for Wayfinding in Virtual Environments, 1997, Proceedings of the 10th annual ACM symposium on User interface software and technology UIST '97, pp. 21-30.*

(Continued)

*Primary Examiner* — Michael J Cobb (74) *Attorney, Agent, or Firm* — Alleman Hall Creasman & Tuttle LLP (57) ABSTRACT

In various embodiments, methods and systems for generating thumbnail objects are provided. A thumbnail object generation system supports automatic thumbnail generation based on thumbnail anchor points. The thumbnail object generation system accesses thumbnail anchor points for an object. A thumbnail anchor point indicates a point of interest associated with the object for generating a thumbnail object. The object is positioned within a thumbnail window based on thumbnail anchor points. Positioning the object is based on successive thumbnail anchor points that are accessed. Positioning the object within a thumbnail window includes actuating movement of a virtual camera to keep the object within the thumbnail window while maintaining visibility of the thumbnail anchor points. The thumbnail object is generated based on a final object position for the object in the thumbnail window. The final object position is defined based on the thumbnail anchor points.

20 Claims, 8 Drawing Sheets

(56) References Cited

U.S. PATENT DOCUMENTS

| | | | |
|---|---|---|---|
| 7,089,278 B1* | 8/2006 | Churchill | G06Q 10/10 709/203 |
| 8,132,116 B1* | 3/2012 | Schendel | G06F 3/04817 715/764 |
| 8,196,045 B2 | 6/2012 | Chandratillake et al. | |
| 8,964,005 B2 | 2/2015 | Ozawa | |
| 9,070,402 B2 | 6/2015 | Burtnyk et al. | |
| 9,081,420 B2 | 7/2015 | Kuno et al. | |
| 9,177,207 B2 | 11/2015 | Kennedy et al. | |
| 2006/0156237 A1* | 7/2006 | Williams | G11B 27/34 715/720 |
| 2006/0236251 A1* | 10/2006 | Kataoka | G06F 3/0481 715/757 |
| 2007/0055940 A1* | 3/2007 | Moore | G06F 3/0481 715/738 |
| 2007/0118818 A1* | 5/2007 | Gunderson | G06F 9/50 715/838 |
| 2008/0012863 A1* | 1/2008 | Finn | G06T 13/20 345/473 |
| 2008/0027985 A1* | 1/2008 | Kasperkiewicz | G06F 17/30241 |
| 2008/0104535 A1 | 5/2008 | DeLine et al. | |
| 2008/0235585 A1* | 9/2008 | Hart | G06F 17/30058 715/717 |
| 2010/0145936 A1* | 6/2010 | Grinstein | G06F 3/0486 707/724 |
| 2010/0325585 A1* | 12/2010 | Ishizuka | G06F 3/14 715/838 |
| 2011/0016429 A1* | 1/2011 | Yoshihama | G06F 3/04817 715/838 |
| 2011/0119627 A1* | 5/2011 | Cho | G06F 16/168 715/811 |
| 2011/0187716 A1* | 8/2011 | Chen | G06F 3/048 345/427 |
| 2012/0272192 A1* | 10/2012 | Grossman | G06F 17/2288 715/854 |
| 2013/0063495 A1 | 3/2013 | Milan et al. | |
| 2014/0195963 A1 | 7/2014 | Cheung et al. | |
| 2015/0160796 A1 | 6/2015 | Chen et al. | |
| 2016/0224593 A1* | 8/2016 | Qiu | G06N 20/00 |
| 2017/0074688 A1* | 3/2017 | Crickmore | G01D 18/00 |
| 2017/0249719 A1* | 8/2017 | Kansara | G06T 3/0012 |
| 2018/0003979 A1* | 1/2018 | Nakashima | G02B 27/0172 |
| 2018/0063482 A1* | 3/2018 | Goesnar | H04N 5/2226 |
| 2018/0074688 A1* | 3/2018 | Cheng | G06T 3/20 |
| 2019/0088030 A1* | 3/2019 | Masterson | G06T 19/20 |

OTHER PUBLICATIONS

Pierce JS, Pausch R, Navigation with Place Representations and Visible Landmarks, 2004, Proceedings of the 2004 Virtual Reality VR '04, pp. 173-180, 288.*

Limper, et al., "Evaluating 3D Thumbnails for Virtual Object Galleries", In Proceedings of the 20th International Conference on 3D Web Technology, Jun. 18, 2015, pp. 17-24.

Joshi, et al., "Real-Time Hyperlapse Creation via Optimal Frame Selection", In Journal of ACM Transactions on Graphics, vol. 34, Issue 4, Aug. 2015, 9 pages.

Tsang, et al., "Game-like navigation and responsiveness in non-game applications", In Magazine of Communications of the ACM, vol. 46, Issue 7, Jul. 2003, pp. 56-61.

* cited by examiner

AUTOMATED THUMBNAIL OBJECT GENERATION BASED ON THUMBNAIL ANCHOR POINTS

BACKGROUND

A thumbnail can refer to a reduced-sized version of representations of digital objects or content (e.g., two-dimensional (2D), three-dimensional (3D) objects, pictures or videos). Thumbnails can serve as an organizational element to support exploration of objects in computing systems storage and interfaces. Thumbnails, by way of example, can be specifically created for 3D objects or 3D computer graphics, where 3D objects are generated based on three-dimensional representations of geometric data; 3D objects can be used in various fields for representing objects. Different types of objects (2D or 3D) can be organized using graphical interface representations for easy access and recognition of the objects when accessed in computing systems. As such, a comprehensive system for generating thumbnails can improve how objects are stored, retrieved and presented in computing systems.

SUMMARY

Embodiments described herein provide methods and systems for generating thumbnail objects based on thumbnail anchors points. A thumbnail object generation system generates thumbnail objects using thumbnail anchor points identified for an object, where the thumbnail anchor points indicate a point of interest associated with the object. A thumbnail anchor point is identified to generate a thumbnail object for the object. Thumbnail anchor points may be associated with a priority attribute that indicates the importance of a particular thumbnail anchor point relative to other thumbnail anchor points. Thumbnail anchor points may also be dynamically modified (i.e., moved, deleted, added, etc.) relative to a previous selection of the thumbnail anchor point. As thumbnail anchor points are identified, the thumbnail generation system positions the object within a thumbnail window based on the thumbnail anchor points. The thumbnail object, which is an alternate representation of the object, is generated based on a final object position for the object in the thumbnail window. The final object position is defined based on the thumbnail anchor points.

In one embodiment, the thumbnail anchor points are specifically associated with 3D objects. Positioning the 3D object within a thumbnail window includes actuating movement of a virtual camera to keep the 3D object within the thumbnail window while maintaining visibility of the thumbnail anchor points. The thumbnail window can be defined based on a viewport or frustum such that the thumbnail window has specific dimensions within which the 3D object is positioned. It is contemplated that positioning the 3D object or a 2D object within the thumbnail window can be associated with positioning restrictions that trigger alternate techniques for generating the thumbnail object. For example, the thumbnail object generation system supports cases where, for a 3D object, a first thumbnail anchor point and a second thumbnail anchor point, are not both visible from a singular viewing angle. As such, the thumbnail object can be created with a first representation of the 3D object and a second representation of the 3D object both positioned within the thumbnail window. The first representation of the 3D object and the second representation of the 3D object may be presented along with graphical element (e.g., a filter) such that both are shown simultaneously within the thumbnail window. It is also contemplated that the thumbnail object can be generated as a 2D or 3D object, as needed.

In some embodiments, the thumbnail anchor points are determined based on a search query term, where a search query term is used to identify a portion within the object that satisfies the search query term. The portion within the object that satisfies the search query term is selected as the thumbnail anchor point such that the thumbnail is generated based on a final object position for the object in the thumbnail window. The final object position is defined based on the thumbnail anchor points identified using the search query term. When multiple portions of the same object satisfy the search query term, the corresponding thumbnail anchor points can be used to generate the thumbnail object using the different techniques described herein.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Thumbnails can serve as an organizational element to support exploration of objects in computing systems storage and interfaces. Thumbnails, by way of example, can be specifically created for 3D objects or 3D computer graphics, where 3D objects are generated based on three-dimensional representations of geometric data; 3D objects can be used in various fields for representing objects. Different types of objects (2D or 3D) can be organized using graphical interface representations for easy access and recognition of the objects when accessed in computing systems. As such, a comprehensive system for generating thumbnails can improve how objects are stored, retrieved and presented in computing systems.

Conventional methods for generating thumbnails fall short of providing suitable and automated results for defining and generating thumbnails for objects. By way of example, with reference to 3D objects, a user who wants to create a thumbnail for a 3D object may manually position a virtual camera associated with a 3D object, and then select a portion (e.g., via resizing a window or providing a window selection indication) of the 3D object for generating a thumbnail of the 3D object. This portion can be cropped into a thumbnail of the 3D object. However, there are several shortcomings with merely identifying a portion of the 3D object for use in generating a thumbnail. For example, the 3D object may not be easily positioned and defined within an anticipated thumbnail window. Also, reducing the size of the 3D object may result in the object being too small within the thumbnail window. Moreover, current approaches require significant manual intervention on the part of the user to create the thumbnail. Further, for 3D objects, the thumbnail quality is degraded when the thumbnail is generated based on resizing or cropping a portion of the 3D object instead of a full rendering process. As such, a comprehensive thumbnail generation system can facilitate the generation of thumbnails.

Embodiments of the present invention provide simple and efficient methods and systems for generating thumbnail objects. At a high level, a thumbnail object generation system supports automatic thumbnail generation based on thumbnail anchor points. The thumbnail object generation system accesses thumbnail anchor points for an object; a thumbnail anchor point indicates a point of interest associated with the object for generating a thumbnail object. The object is positioned within a thumbnail window based on thumbnail anchor points. The thumbnail window can be defined based on a viewport or frustum such that the thumbnail window has specific dimensions within which the 3D object is positioned. Positioning the object is based on successive thumbnail anchor points that are accessed. Positioning the object within a thumbnail window includes actuating movement of a virtual camera to keep the object within the thumbnail window while maintaining visibility of the thumbnail anchor points. The thumbnail object is generated based on a final object position for the object in the thumbnail window. The final object position is defined based on the thumbnail anchor points.

Various terms are used throughout this description. Although more details regarding various terms are provided throughout this description, general definitions of some terms are included below to provider a clearer understanding of the ideas disclosed herein:

A thumbnail anchor point can refer to a position associated with an object. The thumbnail anchor point can specifically be a point of interest of the object. As used herein, object contemplates 2D and 3D digital objects or representations thereof. An object is not limited to a focal point (e.g., a primary object within an entire scene of the object) but also surrounding portions of the object. In this regard, the thumbnail anchor point can be a point selected from a focal point of the object or the surrounding area proximate the focal point of the object. For example, a 3D object includes all portions of the digital image and a thumbnail anchor point can be identified as any position associated with the 3D object. A thumbnail anchor point can identified based on a search query term, where the search query term is used to locate a portion of an object and the portion is selected as a thumbnail anchor point. Several thumbnail anchor points can be selected for an object, based on a search query term, to generate a thumbnail object for the corresponding object.

A thumbnail object can refer to an alternate representation of an object. The thumbnail object can be a miniature or a reduced-sized version of an object. The object can be different types of digital objects and in some embodiments the thumbnail object is a 3D object. The thumbnail object is associated with a thumbnail window, where the thumbnail window can be defined based on a viewport or frustum. As such, the thumbnail window has specific dimensions within which the 3D object is positioned. A thumbnail window can be selected from a plurality of thumbnail windows of different sizes in order to achieve correspondingly sized thumbnail object. The selected thumbnail window is then used to position the object within the thumbnail window to generate the thumbnail object. The thumbnail window can be associated with different object representation schemes for the object. The object is positioned within the thumbnail window based on a particular object representation scheme that indicates the number of object representations and configuration elements for the object representations in the thumbnail window. The object representation schemes are determined based in part on positioning restrictions, as described herein in more detail.

Positioning can refer to placing an object within a thumbnail window based on one or more thumbnail anchor points. In operation, by way of example, a thumbnail anchor point may be received via a selection from an interface displaying the object. In embodiments, the input indicating the position is transformed from a 2D input into a 3D input and a casting operation (e.g., ray-casting or sphere casting) is performed to identify a position of the thumbnail anchor point in 3D space. Positioning can also be based on a virtual camera rotating to keep the object within the thumbnail window while maintaining visibility of selected thumbnail anchor points within the thumbnail window. Positioning can be further based on positioning restrictions that define configuration limitations for placement of the object within a thumbnail window. The positioning restriction can include thumbnail-safe-area (e.g., predefined boundary areas) where the thumbnail anchor points can be adequately placed within the thumbnail window (e.g., viewport or frustum). Positioning restrictions that cannot be satisfied can trigger alternate techniques for generating the thumbnail object.

Alternate techniques include using different object representation schemes to position one or more object representations in the thumbnail window, while maintaining visibility of the thumbnail anchor points. An object representation scheme determines the number of object representations and how the object representations will be positioned in the thumbnail window for the thumbnail object. For example, the object may have a single object representation in the thumbnail or the object may have multiple object representations in the thumbnail. The object representation scheme may also determine the type of configuration elements (e.g., graphical element, placement configuration, filters, etc.) that will be used to display the one or more object representations. For example, positioning with alternative techniques supports cases where, for a 3D object, a first thumbnail anchor point and a second thumbnail anchor point, are not both visible from a singular viewing angle. As such, the thumbnail object can be created with multiple object representations (i.e., a first representation of the 3D object and a second representation of the 3D object both positioned within the thumbnail window).

Figure 1:
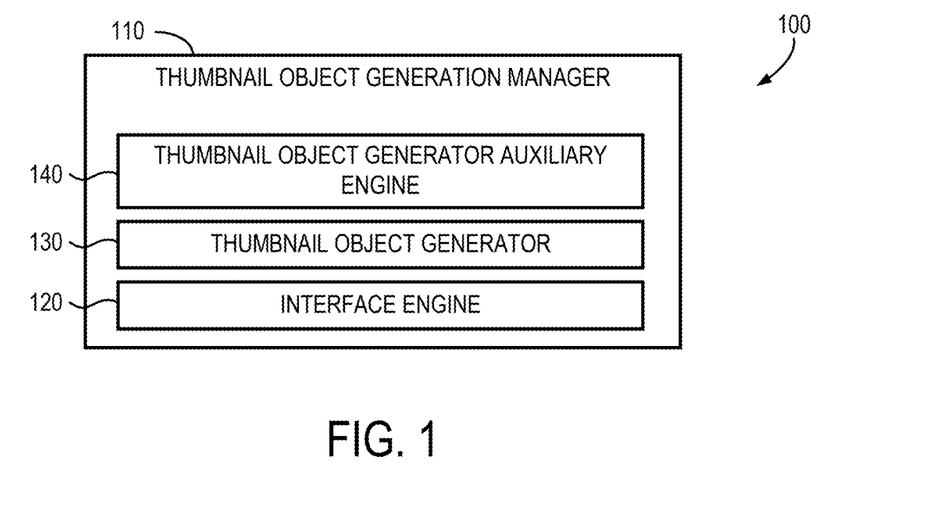
FIG. 1 is a schematic showing an exemplary thumbnail object generation system, in accordance with embodiments of the present invention.

With reference to FIG. 1, embodiments of the present disclosure can be discussed with reference to an exemplary thumbnail object generation system 100 in which implementations of the present disclosure may be employed. FIG. 1 shows a high level architecture of the thumbnail object generation system 100 having an infrastructure and communicating using components in accordance with implementations of the present disclosure. The thumbnail object generation system includes a thumbnail object generation manager 110 having interface engine 120, a thumbnail object generator 130, and thumbnail object generator auxiliary engine 140. A system as used herein refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other system and components thereof. The components of the thumbnail object generation system facilitate generating thumbnail object based on thumbnail anchor points.

Having identified various components of the thumbnail object generation system, it is noted that any number of components may be employed to achieve the desired functionality within the scope of the present disclosure. The various components of FIG. 1 are shown with lines for the sake of clarity. Further, although some components of FIG. 1 are depicted as single components, the depictions are exemplary in nature and in number and are not to be construed as limiting for all implementations of the present disclosure. The thumbnail object generation system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 1, the interface engine 120 is responsible for facilitating communication with internal and external components of the thumbnail object generation system 100. The interface engine 120 supports receiving input for identifying thumbnail anchor points. Using the thumbnail anchor points, the thumbnail object is positioned within a thumbnail window. The thumbnail window can be a viewport having a defined area (e.g., a frame display area) for viewing the thumbnail object. The thumbnail window can be defined based on a viewport or frustum such that the thumbnail window has specific dimensions within which the object is positioned. The interface engine 120 can support presenting a plurality of thumbnail window options, having different dimensions, from which a thumbnail window can be selected. The selected thumbnail window is then used to position the object within the thumbnail window to generate the thumbnail object.

The interface engine 120 can further support identifying thumbnails based on a direct selection of a portion of an object or based on an indirect selection of a portion of the object. With reference to the direct selection, by way of example, a user may be presented with a 3D object on a device display associated with the thumbnail object generator system 100. Different types of inputs (tapping, clicking, typing, etc.) and input devices (touchscreen, mouse, keyboard etc.) are contemplated herein for receiving user inputs for identifying thumbnail anchor points. The thumbnail anchor points can also be dynamically modified (i.e., moved, deleted, added, etc.), as discussed in more detail below.

With reference to indirect selection, by way of example, a user may be presented with a search query term input interface, where the user enters a search query term. The search query term can be used to identify a portion of an object that corresponds to the search query term. For example, a collection of pictures (e.g., stored in the thumbnail object generation auxiliary engine 140) can be accessed based on receiving a search query term "TOY". The collection of pictures can be searched to identify portions of pictures that include a toy. The thumbnail object generation manager 110 supports or is operable with an internal or external object detection engine (e.g., the thumbnail object generation auxiliary engine 140) that identifies particular objects within photographs. Object detection engines are well known in the art and as such are not further discussed herein. The portion of the picture that includes the dog is identified as a thumbnail anchor point and processed to generate thumbnail objects based on additional techniques described herein. Thumbnail objects for pictures that satisfy the search query term can be dynamically presented on a display, using the interface engine 120, as objects that satisfy the search query term are used to identify thumbnail anchor points and generate thumbnail objects.

During direct selection or indirect selection via the interface engine 120, the interface engine can support providing visual feedback using graphical interface elements (e.g., highlighting, icons, numbering) to show selection of different thumbnail anchor points. Visual feedback, based on graphical interface elements, can also be associated with a priority attribute for a particular selection. A thumbnail anchor point can be prioritized based on user input when selecting the thumbnail. For example, holding the selection for an additional period of time or making the selection with multiple taps on the thumbnail anchor point may communicate an indication to prioritize a particular thumbnail anchor point. A corresponding opposite selection may communicate an indication deprioritize a thumbnail anchor point. Visual feedback can be generated via the interface engine 120 on an object to correspond to a value of the priority attribute. Visual feedback can also be generated via the interface engine 120 for dynamic modification of thumbnail anchor points. Dynamic modification refers to moving, deleting or adding thumbnail for an object. The interface engine 120 uses graphical interface elements to visually communicate modification made to the thumbnail anchor points.

The thumbnail object generator 130 is responsible for generating thumbnail objects based on thumbnail anchor points. The thumbnail object generator 130 can access thumbnail anchor points that are communicated or transmitted from the interface engine 120. As discussed, the thumbnail anchor points can be received in a variety ways in association with an object for generating a thumbnail object for the object. The thumbnail object generator can be specifically responsible for positioning the object within a thumbnail window based on the identified thumbnail anchor points. Positioning the object with a thumbnail window includes actuating movement of a virtual camera. At a high level, actuating the virtual camera is performed to keep the object with the thumbnail window while maintaining visibility the selected thumbnail anchors points within the thumbnail window. In this regard, moving the virtual camera is based on selected thumbnail anchor points. Moving the camera may also be based on a selected thumbnail anchor point and positioning restriction with respect to one or more thumbnails that have already been selected. Positioning can further be based on a priority attribute associated with the thumbnail anchor points. Prioritization can refer to weighting the impact a priority thumbnail anchor point has in the positioning process of an object over other non-priority thumbnail anchor points. In this regard, the priority thumbnail anchor point can remain a primary focus point within a thumbnail window even though other thumbnail anchor points are selected.

The thumbnail object generator can support two different modes for actuating the virtual camera. The thumbnail object generator can support a locked perspective mode and unlocked perspective mode. During a locked perspective mode, a selected perspective associated with a viewport, frustum or viewing angle does not change (or substantially change) as the user selects thumbnail anchor points. As such, the virtual camera may be actuated to zoom-in and zoom-out based on the thumbnail anchor points, without changing the selected perspective. In the unlocked perspective mode, the virtual camera is not locked to a specific perspective associated with a viewport, frustum or viewing angle. As such, the virtual camera can rotate based on the thumbnail anchor points, while changing the perspective. It is contemplated that additional factors (e.g., positioning restrictions and priority attributes) can influence the position of the object within the thumbnail window in combination with the particular selected perspective mode.

The thumbnail object generator 130 can also support positioning restrictions that trigger alternate techniques for generating the thumbnail object. A positioning restriction that defines configuration limitations within a thumbnail window for placement of the object. A positioning restriction can include thumbnail-safe-area (e.g., predefined boundary areas) where the thumbnail anchor points can be adequately placed within the thumbnail window (e.g., viewport or frustum). For example, a positioning restriction may indicate a degree angle between a first thumbnail anchor point and a second thumbnail anchor point, or a distance between the first thumbnail anchor point and a second thumbnail anchor point such that when the positioning restriction not satisfied an alternate technique is used to position the object within the thumbnail window. Thumbnail object generator 130 implements alternate techniques that include using different object representation schemes to position one or more object representations in the thumbnail window, while maintaining visibility of the thumbnail anchor points. An object representation scheme determines how many object representations will be positioned in the thumbnail window for the thumbnail object. For example, the object may have a single object representation in the thumbnail or the object may have multiple object representations in the thumbnail. Thumbnail object generator 130 uses the object representation scheme to determine the type of configuration elements (e.g., graphical element, placement configuration, filters, etc.) that will be used to display the one or more object representations. The thumbnail object generator auxiliary engine 140 can be used as a data store for different priority attribute data, graphical elements, object representation schemes and configuration elements information that are accessed while generating the thumbnail object.

Thumbnail object generator 130 is also responsible for performing preliminary processing (e.g., transformation and casting) for received input indicating thumbnail anchor points. For example, with reference to 3D objects, an input may be received to indicate the thumbnail anchor point. The input is then transformed from a 2D representation to a 3D representation. The 3D representation can be used to perform casting (e.g., ray-casting or sphere casting) to determine a portion of object that was selected as the anchor. At a high level, casting is used to perform intersection tests to understand the position of objects in three dimensional spaces. In particular, casting using the thumbnail object generator 130 can include determining intersection points with the object to identify the selected portion as the thumbnail anchor point.

Thumbnail object generator 130 may perform calculations for positioning the object based on virtual boundaries. A virtual boundary is defined around the selected portion of an object for which a thumbnail object is to be made. A size of the virtual boundary may correspond to a priority associated with the thumbnail anchor point. As such, the virtual boundary can correspond to the priority and used in weighting a priority thumbnail anchor point over non-priority thumbnail anchor points during the positioning process. As discussed above, the interface engine 120 may generate interface elements that visually communicate the defined virtual boundary. With each virtual boundary that is defined for thumbnail anchor points a calculation based on factors (e.g., thumbnail anchors point, priority, positioning restrictions, and thumbnail window dimensions) is made to position the object within a thumbnail window. For example, a rectangular area of a viewport of thumbnail window is identified to position the object. The thumbnail object generator 130 actuates the virtual camera which operationally causes an animation associated with the object to place the object in a particular position. In this regard, the user has constant feedback and control, via the interface engine 120, of how the thumbnail object is being generated. A final object position for the object in the thumbnail window is used to generate the thumbnail object. It is contemplated that the thumbnail object can be generated as a 2D thumbnail object or 3D thumbnail object. The thumbnail object can specifically be rendered from 3D data which produces a rendered quality thumbnail object image compared to a screen capture of a portion of the object. As such, the thumbnail generation system support automatic and interactive generation of a thumbnail object based on identified thumbnail anchor points of the object.

Figure 2:
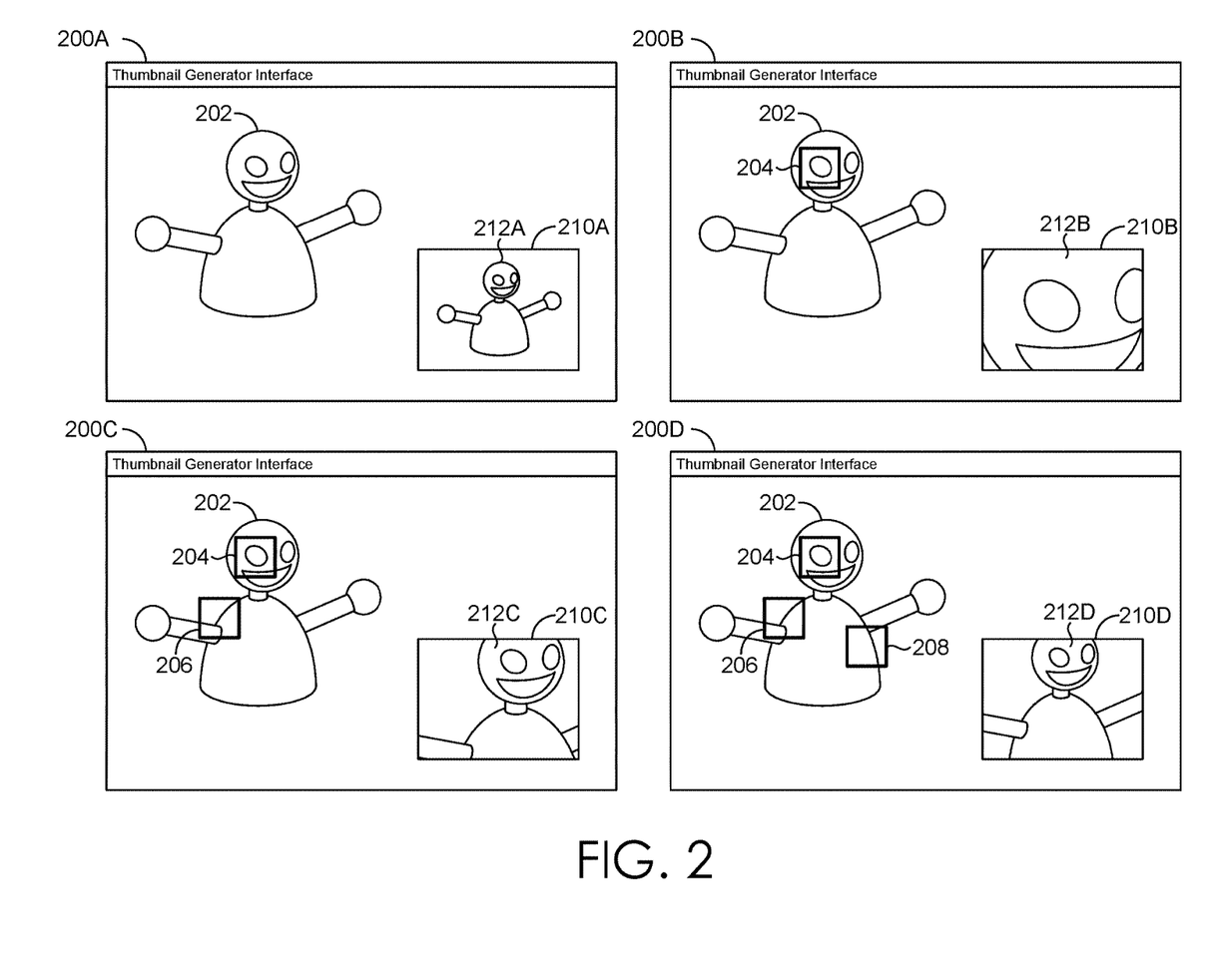
FIG. 2 is an illustration of an exemplary implementation of thumbnail object generation based on thumbnail anchor points, in accordance with embodiments of the present invention.
Figure 3:
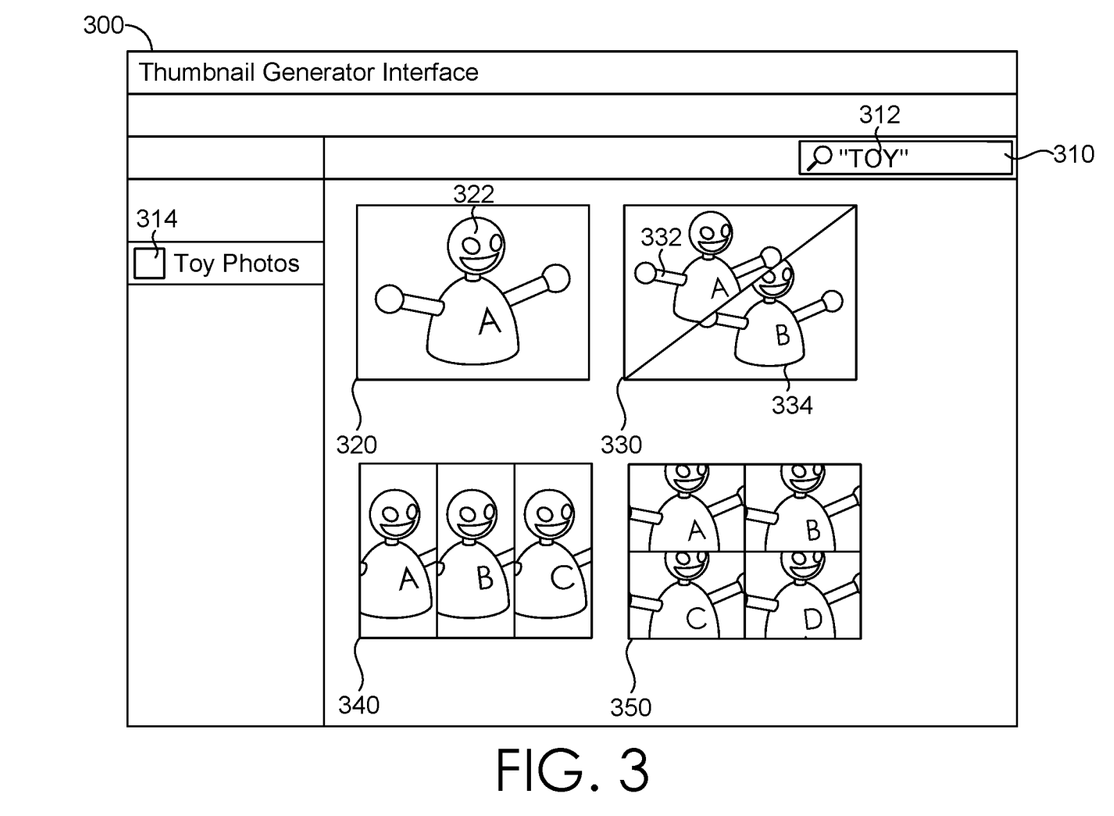
FIG. 3 is an illustration of an exemplary implementation of thumbnail object generation based on thumbnail anchor points identified using a search query term, in accordance with embodiments of the present invention.
Figure 4:
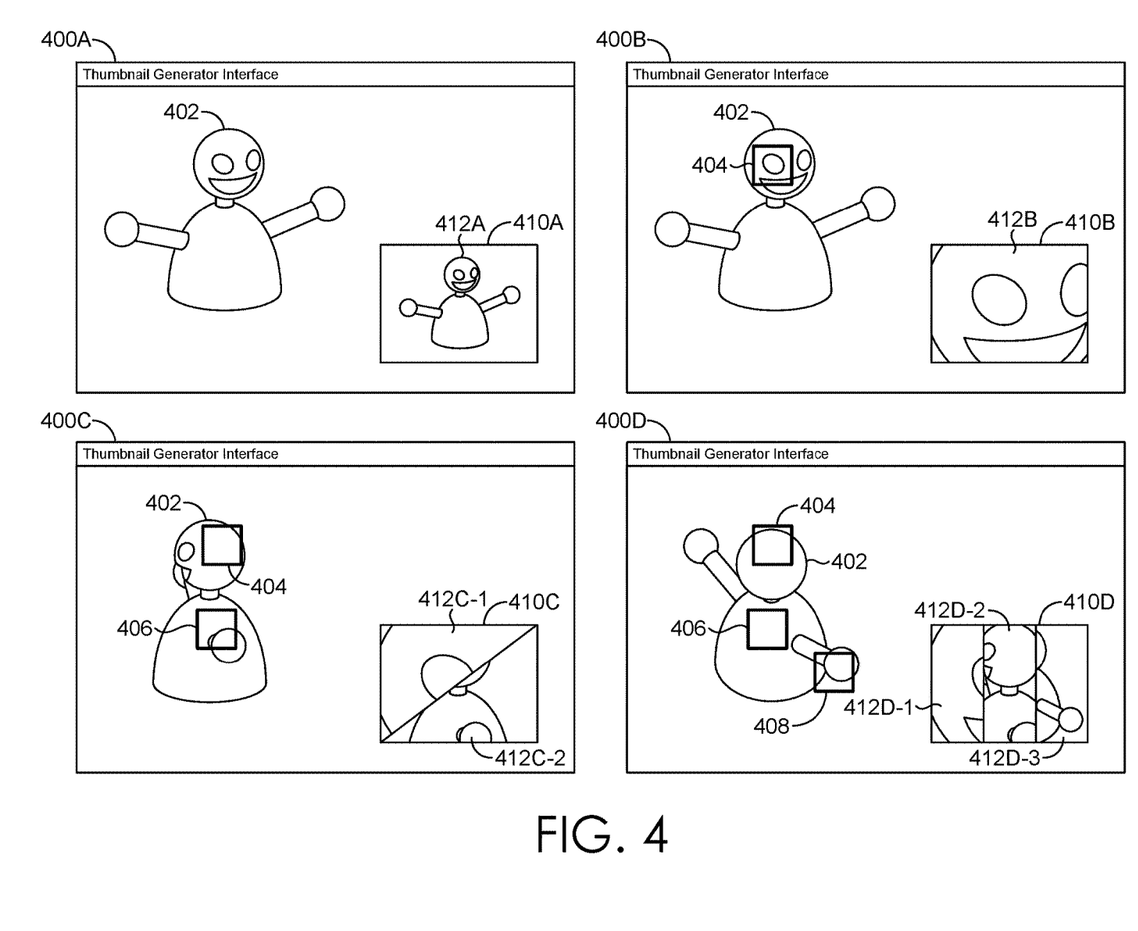
FIG. 4 is an illustration of an exemplary implementation of thumbnail object generation based on thumbnail anchor points, in accordance with embodiments of the present invention.

With reference to FIGS. 2-4, several illustrations of exemplary implementations of generating thumbnail objects based on thumbnail anchor points, in accordance with embodiments of the present invention, are provided. As discussed above, generating thumbnail objects can be based on the components of the thumbnail object generation system. FIG. 2 includes illustrations of exemplary display windows for generating thumbnail objects. A display window can be generated on a display via a computing device that supports the thumbnail generation system. The thumbnail generator interface 200A display window includes a 3D object 202 and thumbnail window 210A. The thumbnail window 210A includes the 3D object 212A that is a thumbnail representation of the 3D object 202 in its entirety.

The thumbnail generator interface 200B shows a selected thumbnail anchor point 204 that is a portion of the 3D object 202. The thumbnail anchor point 204 can be selected based on techniques described herein. The thumbnail anchor points can be associated with a priority attribute that indicates an importance of the thumbnail anchor point. The thumbnail anchor point can also be dynamically modified (e.g., moved, deleted, or added). The selected portion can also include a graphical element providing visual feedback of the selected portion. Based on selecting thumbnail anchor point 204 a virtual camera is actuated to cause animation of the 3D object 212A thumbnail window 210A to 3D object 212B in the thumbnail window 210B. The position of 3D object 212B is based on the selected thumbnail anchor point 204.

The thumbnail generator interface 200C shows a second selected thumbnail anchor point 206 that is a portion of the 3D object 202. Based on selecting thumbnail anchor point 206 a virtual camera is actuated to animate the 3D object 212B thumbnail window 210B to 3D object 212C in the thumbnail window 210C. The position of 3D object 212C is based on the selected thumbnail anchor point 206. The thumbnail generator interface 200D shows a third selected thumbnail anchor point 208 that is a portion of the 3D object 202. Based on selecting thumbnail anchor point 208 a virtual camera is actuated to cause animation of the 3D object 212C thumbnail window 210C to 3D object 212D in the thumbnail window 210D. The position of 3D object 212D is based on the selected thumbnail anchor point 206. As discussed herein, upon each successive selection of a thumbnail anchor point a virtual boundary is defined around the selected portion of an object for which a thumbnail object is to be made. With each virtual boundary that is defined for thumbnail anchor points a calculation based one or more factors (e.g., other thumbnail anchors point, priority, positioning restrictions, thumbnail window dimensions) causes animation of the object to a final object position. The 3D object 212D in the thumbnail window 210D shows the 3D object 202 in a final object position that is used to generate a thumbnail object.

Turning to FIG. 3, FIG. 3 includes illustrations of exemplary display windows for generating thumbnail objects. In particular, thumbnails object are generated based on receiving a search query term that is used to identify a portion of an object. The portion of the object is selected as a thumbnail anchor point and used to generate a thumbnail object, in accordance with embodiments of the present invention. The thumbnail generator interface 300 display window is an exemplary folder view for organizing, viewing and searching different types of objects (e.g., 2D objects, 3D objects, pictures, and videos). The thumbnail generator interface 300 includes a search input field 310 where a search query term can be received and a folder Toy Photos 314 where different types. Other variations and combination of folder views for objects and interface inputs for search query terms are contemplated with embodiments described herein. The search query term "TOY" 312 is received to search the Toy Photos 314 folder.

Several different thumbnail objects (e.g., thumbnail object 320, thumbnail object 330, thumbnail object 340 and thumbnail object 350) can be automatically generated and presented as search results. At a high level, any object in the Toy Photos 314 folder that satisfies the search query term based on performing object detection on the objects can be selected and then the portion of that object that satisfied the search query term is used to create a thumbnail objects as a search result. If multiple portions within the object satisfy the search query term, then each portion of the object that satisfies the search query term can used to generate the thumbnail object. The thumbnail object can be generated with graphical elements that delineate the different portions of the object.

As shown in FIG. 3, thumbnail object 320 includes object portion 322 where the object portion 322 satisfies the search query term and the thumbnail object 320 was automatically generated as a result. Thumbnail object 330 includes object portion 332 and object portion 334 selected to generate the thumbnail object 330. Thumbnail object 330 can be generated such that multiple object portions that satisfy the search query term are used to generate the thumbnail object 330 and presented simultaneously therein. Thumbnail objects 340 and thumbnail object 350 illustrate alternate configurations for generating and presenting thumbnail objects. As a result, a thumbnail generation system can be used to quickly identify objects that satisfy the search query term and further present the objects corresponding thumbnail objects generated based on techniques described herein.

With reference to FIG. 4, FIG. 4 includes illustrations of exemplary display windows for generating thumbnail objects. In particular, the thumbnails are generated based on determining that a position of a first representation of a 3D object based on both the first thumbnail anchor point and the second thumbnail anchor point does not satisfy a positioning restriction. The thumbnail generation interface 400A includes 3D object 402 and the thumbnail window 410A includes the 3D object 412A that is a thumbnail representation of the 3D object 402 in its entirety. The thumbnail anchor point 404 can be selected based on techniques described herein. The position of 3D object 412B is based on the selected thumbnail anchor point 404.

The thumbnail generator interface 400C shows a second selected thumbnail anchor point 406 that is a portion of the 3D object 402. Based on selecting thumbnail anchor point 406 and attempting to position the 3D object 402 within the thumbnail window, a determination is made that a position of a first 3D object 412B based on both the first thumbnail anchor point 404 and the second thumbnail anchor point 406 does not satisfy a positioning restriction. As discussed, positioning can be based on positioning restrictions that define configuration limitations within a thumbnail window for placement of the object. Positioning can be based on positioning restrictions that trigger alternate techniques for generating the thumbnail object. In this case, the first thumbnail anchor point 404 and the second thumbnail anchor point 406 are not visible for the same angle. As such, an object representation scheme that supports multiple views of 3D object 402 is used. As shown in thumbnail window 410C, a 3D object 412C-1 is a first representation of 3D object 402 and 3D object 412C-2 is a second representation of 3D object 402. Thumbnail generator interface 400D shows a third selected thumbnail point that is a portion of the 3D object 402. Based on selecting the thumbnail anchor point 408 a determination that a positioning restriction is not satisfied is made. As such, an object representation scheme for three object representations is used. As shown in thumbnail window 410D, a 3D object 412D-1 is a first representation of 3D object 402 and 3D object 412C-2 is a second representation of 3D object 402 and 3D object 412D-3 is a third representation of the 3D object 402. The plurality of 3D objects in the thumbnail window 410D show the 3D object 202 in a final object position having multiple positions that are used to generate a corresponding thumbnail object.

Figure 5:
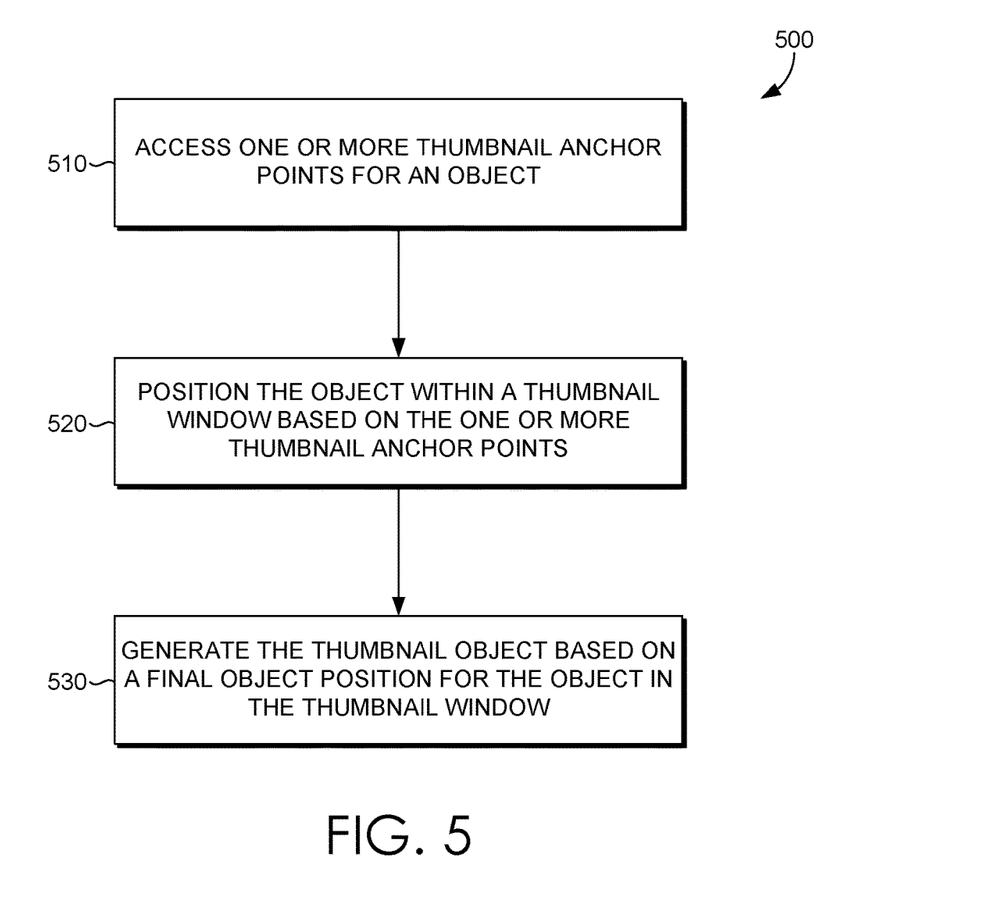
FIG. 5 is a flow diagram showing a method for thumbnail object generation based on thumbnail anchor points, in accordance with embodiments of the present invention.

With reference to FIG. 5, a method for generating thumbnail objects based on thumbnail anchor points is provided. The method 500 can be performed using the thumbnail object generation system 100 described herein. Initially at block 510, a thumbnail object generator accesses one or more thumbnail anchor points for an object. The thumbnail anchor point is a point of interest associated with the object.

The thumbnail anchor point is selected to generate a thumbnail object for the object. An interface engine receives input for identifying the one or more thumbnail anchor points. The input is selected from one of the following: a direct selection of a portion of the object or an indirect selection of a portion of the object based on a search query term. The search query term is used to identify the portion within the object that satisfies the search query term, the portion within the object that satisfies the search query term is selected as a search-query-term-based thumbnail anchor point.

During selection of the thumbnail anchor point, interface engine receives input one of the following perspective modes: a locked perspective mode, where a locked perspective is a selected perspective associated with a viewport, frustum or viewing angle does not change as thumbnail anchor points are selected and an unlocked perspective mode, where an unlocked perspective is a selected perspective associated with a viewport, frustum or viewing angle that changes as thumbnail anchor points are selected. The interface engine also generates visual feedback for identifying one or more of the following: a priority attribute, dynamic modification, and a thumbnail window. The priority attribute is associated with a selected thumbnail anchor point, where the priority attribute indicates the importance of the selected thumbnail anchor point relative to other thumbnail anchor points in the positioning process. A dynamic modification is associated with the selected thumbnail anchor point; the modification indicates moving, deleting, or adding the selected anchor point associated with the object. A thumbnail window is selectable from a plurality of thumbnail windows, each of the plurality of thumbnail windows having different dimensions. The interface engine communicates the thumbnail anchor points to the thumbnail generation system.

At block 520, the thumbnail object generator positions the object within a thumbnail window based on the one or more thumbnail anchor points. Positioning the object is based on each successive thumbnail anchor point from the one or more thumbnail anchors points. Positioning the object is based at least in part on transforming an input identifying a portion of the object into a three-dimensional representation, performing a casting operation based on the three-dimensional representation to determine one or more intersection points of the object, and creating, based on the one or more intersection points a virtual boundary associated with the portion of the object. Positioning the object within the thumbnail window includes actuating movement of a virtual camera to keep the object within the thumbnail window while maintaining visibility of the one or more thumbnail anchor points within the thumbnail window. Positioning the object within the thumbnail is further based on a positioning restriction that defines a thumbnail-safe-area within the thumbnail window within which the thumbnail anchor points are to be located.

At block 530, the thumbnail object generator generates the thumbnail object based on a final object position for the object in the thumbnail window. The final object position is defined based on the one or more thumbnail anchor points. The thumbnail object can be generated as a 2D thumbnail object or 3D thumbnail object. The thumbnail object can specifically be rendered from 3D data which produces a rendered quality thumbnail object image.

Figure 6:
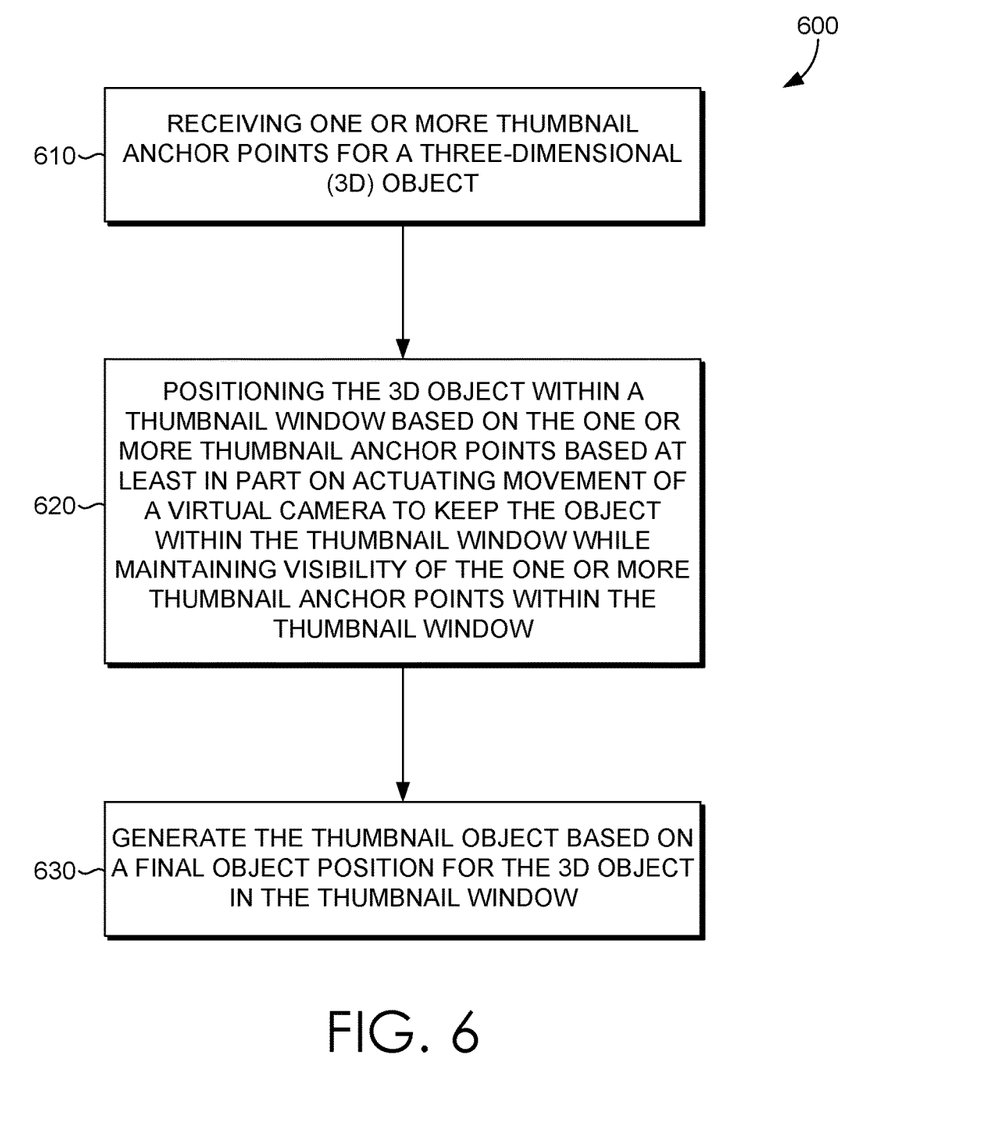
FIG. 6 is a flow diagram showing a method for thumbnail object generation based on thumbnail anchor points, in accordance with embodiments of the present invention.

With reference to FIG. 6, a method for generating thumbnail objects based on thumbnail anchor points is provided. The method 600 can be performed using the thumbnail object generation system 100 described herein. Initially at block 610, one or more thumbnail anchor points for a three-dimensional (3D) object are received. A thumbnail anchor point is a point of interest associated with the object; the thumbnail anchor point is selected to generate a thumbnail object for the object. At least one thumbnail anchor point of the one or more thumbnail anchor points is associated with a priority attribute; the priority attribute indicates the importance of a selected thumbnail anchor point relative to other thumbnail anchor points in the positioning process. Further, at least one thumbnail anchor point of the one or more thumbnail anchor points is received based on a dynamic modification; the dynamic modification indicates moving, deleting, or adding the selected anchor point associated with the object.

At block 620, the 3D object is positioned within a thumbnail window based on the one or more thumbnail anchor points. The positioning the 3D object is based on each successive thumbnail anchor point from the one or more thumbnail anchor points. Positioning the 3D object within the thumbnail window is based at least in part on actuating movement of a virtual camera to keep the object within the thumbnail window while maintaining visibility of the one or more thumbnail anchor points within the thumbnail window.

At block 630, the thumbnail object is generated based on a final object position for the 3D object in thumbnail window. The final object position is defined based on the one or more thumbnail anchor points. Generating the thumbnail object is based rendering the thumbnail object based on 3D object data, where the thumbnail object is rendered in two dimensions or three dimensions.

Figure 7:
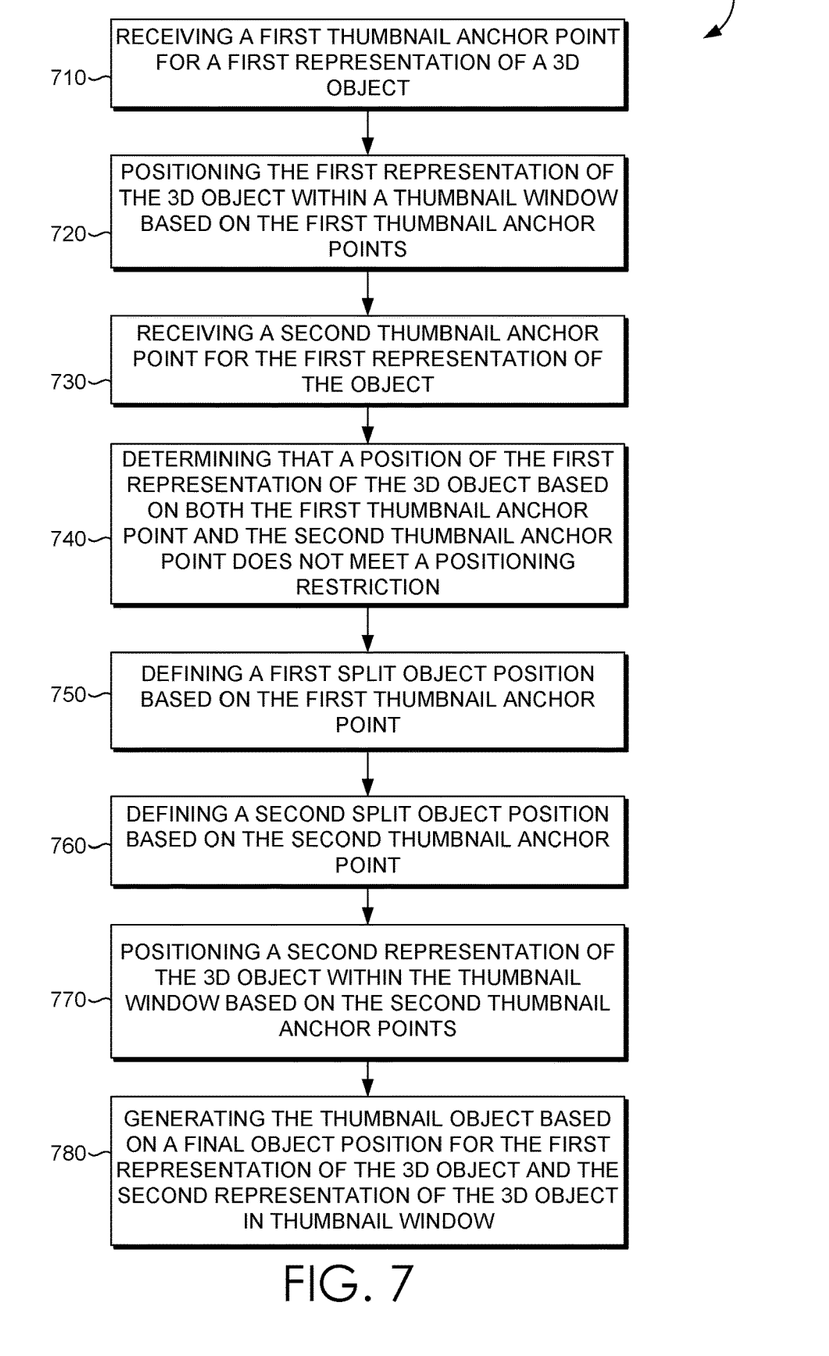
FIG. 7 is a flow diagram showing a method for thumbnail object generation based on thumbnail anchor points, in accordance with embodiments of the present invention.

With reference to FIG. 7, a method for generating thumbnail objects based on thumbnail anchor points is provided. The method 700 can be performed using the thumbnail object generation system 100 described herein. A computer storage medium can include computer-executable instructions that when executed by a processor causes the processor to perform the method. Initially at block 710, a first thumbnail anchor point for a first representation of a 3D object is received. At block 720, the first representation of the 3D object is positioned within a thumbnail window based on the first thumbnail anchor points. At block 730, a second thumbnail anchor point is received for the first representation of the object. At block 740, a determination that a position of the first representation of the 3D object based on both the first thumbnail anchor point and the second thumbnail anchor point does not satisfy a positioning restriction is made. At block 750, a first split object position is defined based on the first thumbnail anchor point. At block 760, a second split object position is defined based on the second thumbnail anchor point. At block 770, a second representation of the 3D object is positioned within the thumbnail window based on the second thumbnail anchor points. At block 780, the thumbnail object is generated based on a final object position for the first representation of the 3D object and the second representation of the 3D object in thumbnail window. The final object position comprises the first split object position for the first representation of the object and the second split object position for the second representation of the object.

With reference to the thumbnail generation system, embodiments described herein support automatic and autonomous configuration of service infrastructure. The thumbnail generation system components refer to integrated components for thumbnail generation. The integrated components refer to the hardware architecture and software framework that support data access functionality using the thumbnail generation system. The hardware architecture refers to physical components and interrelationships thereof and the software framework refers to software providing functionality that can be implemented with hardware embodied on a device. The end-to-end software-based thumbnail generation system can operate within the thumbnail generation system components to operate computer hardware to provide thumbnail generation system functionality. As such, the thumbnail generation system components can manage resources and provide services for the thumbnail generation system functionality. Any other variations and combinations thereof are contemplated with embodiments of the present invention.

By way of example, the thumbnail generation system can include an API library that includes specifications for routines, data structures, object classes, and variables may support the interaction between the hardware architecture of the device and the software framework of the thumbnail generation system. These APIs include configuration specifications for the thumbnail generation system such that the different components therein can communicate with each other in the thumbnail generation system, as described herein.

Figure 8:
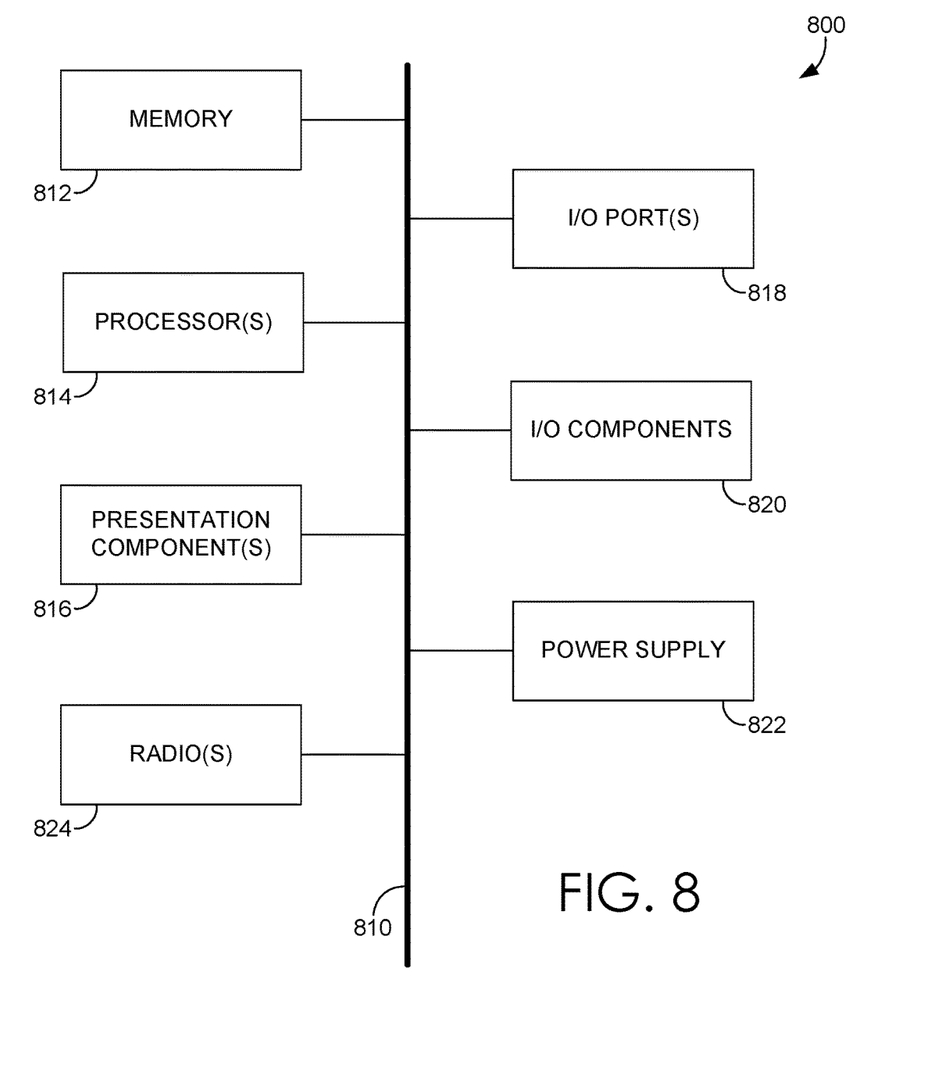
FIG. 8 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the thumbnail generation system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for generating thumbnail objects based on thumbnail anchor points, the system comprising:
one or more processors and memory holding computer program instructions executable by the one or more processors to provide:
a thumbnail object generator configured to:
access a plurality of thumbnail anchor points for an object, wherein each thumbnail anchor point of the plurality of thumbnail anchor points is a point of interest associated with the object;
position the object within a thumbnail window such that two or more thumbnail anchor points of the plurality of thumbnail anchor points are visible within the thumbnail window at the same time; and
generate a thumbnail object based on a final object position for the object in the thumbnail window, wherein the final object position is defined based on the two or more thumbnail anchor points being visible in the thumbnail window at the same time.

2. The system of claim 1, wherein the memory holds instructions executable by the one or more processors to further provide:
an interface engine configured to:
receiving input for identifying the plurality of thumbnail anchor points, wherein the input is selected from one of the following:
a direct selection of a portion of the object; and
an indirect selection of a portion of the object based on a search query term.

3. The system of claim 2, wherein the search query term is used to identify the portion within the object that satisfies the search query term, the portion within the object that satisfies the search query term is selected as a search-query-term-based thumbnail anchor point.

4. The system of claim 1, wherein the memory holds instructions executable by the one or more processors to further provide:
an interface engine configured to:
receive input in one of the following perspective modes:
a locked perspective mode, wherein a locked perspective is a selected perspective associated with a viewport, frustum or viewing angle does not change as thumbnail anchor points are selected; and
an unlocked perspective mode, wherein an unlocked perspective is a selected perspective associated with a viewport, frustum or viewing angle that changes as thumbnail anchor points are selected.

5. The system of claim 1, wherein the memory holds instructions executable by the one or more processors to further provide:
an interface engine configured to:
generate visual feedback for identifying one or more of the following:
a priority attribute associated with a selected thumbnail anchor point, wherein the priority attribute indicates the importance of the selected thumbnail anchor point relative to other thumbnail anchor points;
a dynamic modification associated with the selected thumbnail anchor point, wherein the dynamic modification indicates moving, deleting, or adding the selected anchor point associated with the object; and
the thumbnail window from a plurality of thumbnail windows, wherein each of the plurality of thumbnail windows has different dimensions.

6. The system of claim 1, wherein positioning the object within the thumbnail window is based in part on actuating movement of a virtual camera to keep the object within the thumbnail window while maintaining visibility of the two or more thumbnail anchor points within the thumbnail window.

7. The system of claim 1, wherein positioning the object within the thumbnail window is based in part on:
transforming an input identifying a thumbnail anchor point on a portion of a two-dimensional representation of the object into a three-dimensional representation;
performing a casting operation based on the three-dimensional representation to determine one or more intersection points of the object; and
creating, based on the one or more intersection points, a virtual boundary associated with the portion of the object, wherein the thumbnail window is positioned based on the virtual boundary.

8. The system of claim 1, wherein positioning the object within the thumbnail window is further based on satisfying a positioning restriction of the one or more thumbnail anchor points within the thumbnail window.

9. The system of claim 8, where the thumbnail object generator is further configured to:
 determine that a position of a first representation of the object based on both a first thumbnail anchor point and a second thumbnail anchor point does not satisfy the positioning restriction;
 define a first split object position based on the first thumbnail anchor point;
 define a second split object position based on the second thumbnail anchor point;
 position the first representation of the object within the thumbnail window based on the first thumbnail anchor point;
 position a second representation of the object within the thumbnail window based on the second thumbnail anchor point; and
 generating the thumbnail object based on the final object position for the first representation of the object and the second representation of the object in thumbnail window, wherein the final object position comprises the first split object position for the first representation of the object and the second split object position for the second representation of the object.

10. A computer-implemented method for generating thumbnail objects based on thumbnail anchor points, the method comprising:
 receiving a plurality of thumbnail anchor points for a three-dimensional (3D) object, wherein each thumbnail anchor point of the plurality of thumbnail anchor points is a point of interest associated with the 3D object;
 positioning the 3D object within a thumbnail window such that two or more thumbnail anchor points of the plurality of thumbnail anchor points are visible within the thumbnail window at the same time; and
 generating a thumbnail object based on a final object position for the 3D object in thumbnail window, wherein the final object position is defined based on the two or more thumbnail anchor points being visible in the thumbnail window at the same time.

11. The method of claim 10, wherein at least one thumbnail anchor point of the plurality of thumbnail anchor points is associated with a priority attribute, wherein the priority attribute indicates the importance of a selected thumbnail anchor point relative to other thumbnail anchor points for the positioning process.

12. The method of claim 10, wherein at least one thumbnail anchor point of the plurality of thumbnail anchor points is received based on a dynamic modification, wherein the dynamic modification indicates moving, deleting, or adding the selected anchor point associated with the object.

13. The method of claim 10, wherein the thumbnail window is selected from a plurality of thumbnail windows, wherein each of the plurality of thumbnail windows has different dimensions.

14. The method of claim 10, wherein positioning the object within the thumbnail window is based in part on:
 transforming an input identifying a thumbnail anchor point on a portion of a two-dimensional representation of the 3D object into a three-dimensional representation;
 performing a casting operation based on the three-dimensional representation to determine one or more intersection points of the 3D object; and
 creating, based on the one or more intersection points, a virtual boundary associated with the portion of the 3D object, wherein the thumbnail window is positioned based on the virtual boundary.

15. The method of claim 10, where generating the thumbnail object is based rendering the thumbnail object based on 3D object data, wherein the thumbnail object is rendered in two dimensions or three dimensions.

16. One or more computer storage media not consisting of transitory signals and having computer-executable instructions embodied thereon that, when executed, by one or more processors, causes the one or more processors to perform a method for generating thumbnail objects based on thumbnail anchor points, the method comprising:
 receiving a first thumbnail anchor point for a first representation of a 3D object;
 positioning the first representation of the 3D object within a thumbnail window based on the first thumbnail anchor point;
 receiving a second thumbnail anchor point for the first representation of the 3D object;
 determining that a position of the first representation of the 3D object based on both the first thumbnail anchor point and the second thumbnail anchor point does not satisfy a positioning restriction;
 defining a first split object position based on the first thumbnail anchor point;
 defining a second split object position based on the second thumbnail anchor point;
 positioning a second representation of the 3D object within the thumbnail window based on the second thumbnail anchor points; and
 generating the thumbnail object based on a final object position for the first representation of the 3D object and the second representation of the 3D object in thumbnail window, wherein the final object position comprises the first split object position for the first representation of the 3D object and the second split object position for the second representation of the 3D object.

17. The media of claim 16, wherein positioning the object within the thumbnail window is based in part on actuating movement of a virtual camera to keep the object within the thumbnail window while maintaining visibility of the one or more thumbnail anchor points within the thumbnail window.

18. The media of claim 16, wherein first representation of the 3D object and the second representation of the 3D object may be presented in combination with a graphical element such that both first representation of the 3D object and the second representation of the 3D object are presented simultaneously within the thumbnail window.

19. The media of claim 16, wherein the positioning restriction defines a distance threshold between the first thumbnail anchor point and the second thumbnail anchor point within the thumbnail window.

20. The media of claim 16, wherein the positioning restriction is satisfied based on the first anchor point and the second anchor point being visible from a singular viewing angle within the thumbnail window.

* * * * *